United States Patent Office 3,248,289
Patented Apr. 26, 1966

3,248,289
COMPOSITION FOR PREVENTION AND TREATMENT OF FROTHY BLOAT IN RUMINANTS
Kenichi Shinozaki, Morioka, Iwate, Kosaku Imanishi, Higashi-ku, Osaka, and Tadashi Sawai, Nerimaku, Tokyo, Japan, assignors of one-half to Takeda Chemical Industries Ltd., and of one-half to Nippon Oils & Fats Co., Ltd.
No Drawing. Filed Oct. 17, 1962, Ser. No. 231,297
Claims priority, application Japan, Oct. 19, 1961, 36/37,883
6 Claims. (Cl. 167—53)

This invention relates to a composition for prevention and treatment of frothy bloat in ruminants such as cattle, sheep and goats.

Bloat is a fatal disease which produces much gas due to fermentation of food in the rumen of ruminants. This disease is divided into two groups, i.e., legume bloat caused by pasturage grasses belonging to leguminous plants and feed-lot bloat caused by overfeeding of concentrates, characterized in most cases by abdominal distension.

Bloat is generally caused by overeating of fermentative grasses, particularly of leguminous plants. Frothy bloat, however, may occur by overeating of legumes and of concentrates which are rich in protein, or by weakness of digestive organs, abnormal conditions of animals which inhibits movement and eructation of rumen, etc. When an animal is suffering from the disease, the rumen motility is inhibited, his appetite and rumination are lost, his conjunctiva is congested, difficulty in breathing and loss of the consciousness occur, and the animal will soon die of suffocation.

Bloat, as stated above, is generally caused by heavy feeding of legumes, such as alfalfa and clover which are cheap, economical source of protein, and the use of which is increasing year by year all over the world, and therefore the prevention of bloat is the most important problem in the management of dairy cattle.

Easy, economical and effective methods for the prevention and treatment of frothy bloat have not heretofore been found. Among the preventive methods which are commonly used may be mentioned those in which hay is given to cattle before being turned out to pasture and giving cows pasturage grasses other than those which cause bloat.

The above-mentioned methods, however, are temporizing treatments, and moreover the preventive effect is not satisfactory. On the other hand, there is a method for preventing bloat by drenching animals with various animal or vegetable oils and fats before pasturage but it is said to have had influence on chemical constituents of cattle's milk by continuously using them over a long period, and also there are reports that oils and fats ingested hinder ruminal digestion of cellulose and protein. Therefore, more fundamental studies are required for the practical use.

Moreover, there are methods to exclude gas in rumen through esophagus but this method can not be said to be easy and convenient.

As a curative treatment by medicines, polymerized methyl-silicones are also available. The silicone agents are, however, rather expensive and inconvenient to deal with, and it is found to be not applicable for preventive purpose. Though other many remedies for bloat are known they are not satisfactory ones. Although many attempts were made to cure or prevent bloat, none, as far as the present inventors are aware, was entirely successful.

Taking the above-mentioned reasons into consideration, the present inventors studied intensively and have found a remedy for prevention and treatment of frothy bloat having superior effect to known remedies for bloat, i.e., less toxic and easier in treatment than the known ones, besides the composition of the present invention suits the taste of ruminants, and can easily be obtained at a low cost.

The present invention in its broader aspects contemplates veterinary treatment for bloat in ruminants by new compositions, characterized by comprising non-ionic surface-active agents as mentioned hereinafter as the main active ingredients.

The compositions of the present invention have special utility as mentioned above. It is an object of the present invention to provide new compositions for the prevention and curation of bloat in ruminants. Another object of the present invention is to provide new methods by which bloat in ruminants can be prevented and cured. Further object of the present invention is the provision of new application of non-ionic surface-active agents to veterinary medical field.

With the foregoing and other objects in view, the present invention resides in the novel arrangement and combination of parts and in the details of construction hereinafter described and claimed, it being understood that changes in the precise embodiment of the invention herein described may be made within the scope of what is claimed without departing from the spirit of the present invention.

Other objects and advantages will become apparent from the following description taken in conjunction with the examples.

As the non-ionic surface-active agents which may be used as main components of the compositions for prevention and treatment of frothy bloat of the present invention, there may, for example, be mentioned block polymer of two kinds of same or different polyalkylene glycols selected from the group consisting of polyethylene glycol, polypropylene glycol, polybutylene glycol, polypentylene glycol and so on. As the said polymers, there many, for example, be counted polymer of two kinds of polyethylene glycols, polymer of polyethylene glycol with polypropylene glycol, polymer of two kinds of polypropylene glycols, polymer of polyethylene glycol with polybutylene glycol, polymer of polyethylene glycol with polypentylene glycol, polymer of polypropylene glycol with polybutylene glycol and polymer of two kinds of polybutylene glycol.

The ratio of two components in the aforesaid polymers may be decided in compliance with the need for properties such as physical property and solubility.

Among the characteristics of such polymers, there are, for example, the properties such as tasteless, non-toxic and non-stimulative properties, plasticity and lubricous property, and stability for acid and alkali, non-corrosiveness and less hygroscopicity.

The profitable range of amount of ethyleneoxide in the products is about 10–80%, while polypropylene glycols to be used in the present invention are chosen from the range of polypropylene glycols having average molecular weight of about 1000 to 2000.

The properties of the surface active agents varies in accordance with their molecular weight of polypropylene glycol as well as with its ethylene oxide contents. And, for instance, the characteristic values of two typical polymer in the present invention are mentioned below: A in the following table shows a polymer comprising 20% of ethylene oxide in the product in the case of use of polypropylene glycol of average molecular weight 1000, and B is a polymer comprising 10% of ethylene glycol in the product in the case of use of polypropylene glycol of average molecular weight 2000.

|  | A | B |
|---|---|---|
| External appearance | (¹) | (¹) |
| pH: 25° C.; 2.5% | 8.0 | 7.8 |
| $n_D^{60}$ | 1.4380 | 1.4365 |
| Color 1″ (Lovibond) | R 0.1; Y 0.1 | R 0.1; Y 0.1 |
| Cloud point, 10% solns. (° C.) | 18.0 | 14.0 |
| Surface tension, 25° C., dyne/cm.: | | |
| 1% | 35.5 | 36.7 |
| 0.1% | 41.1 | 38.0 |
| 0.01% | 47.5 | 42.0 |
| 0.001% | 53.6 | 44.8 |
| Specific intersurface tension, 25° C., to lamp oil: | | |
| 1% | 0.190 | 0.078 |
| 0.1% | 0.316 | 0.197 |
| 0.01% | 0.457 | 0.355 |

¹ Colorless liquid.

Besides the above-mentioned polymers, non-ionic surface active agents such as polyalkylene glycols, ethers of the said polyalkylene glycols with primary alcohols, esters of the said polyalkylene glycols with fatty acids, or fatty acids esters of anhydrosorbitol such as sorbitan monolaurate, sorbitan monopalmitate, sorbitan monostearate, sorbitan tristearate, sorbitan monooleate, sorbitan trioleate, or fatty acid esters of anhydrosorbitol to which ethylene oxides are additively polymerized to various degree, such as polyoxyethylene sorbitane monooleate, polyoxyethylene sorbitan monolaurate, and polyoxyethylene sorbitan monostearate, may similarly be used as main active ingredients of the remedies for bloat.

Moreover, in addition to the above-mentioned surface-active agents, alcohols such as octyl alcohol, octanol-2, 2-ethylhexylalcohol, cyclohexanol, lauryl alcohol, cetyl alcohol and stearyl alcohol, aluminum stearate, higher glycols, sulfuric acid esters, phosphoric acid esters such as tributyl phosphate, sulfate oils, oils such as soybean oil and castor oil, and silicone may be used as an adjuvant in the compositions of the present invention.

When administered into cattle, the compositions for prevention and treatment frothy bloat of this invention may be taken in the form of a variety of veterinary preparations.

Usually, only the main component alone or together with an adjuvant is administered, but if necessary, an excipient may also be added and administered in the form of a variety of veterinary preparations, for example, solid preparations such as powders, granules, capsules, tablet, pills, etc., or liquid preparations such as solutions, emulsions, suspensions, etc. and furthermore, for prevention of the disease, it is convenient to admix with feed, or to sprinkle on pastures in the form of powders or solutions, and if circumstances require, the present agent may be directly administered into stomach by means of a catheter.

With regard to the administration dose of the present compositions, about 10-30 grams per day in the case of large animals such as cattle are generally a standard, and in the case of small animals 1-5 grams per day, though that varies depending on the kind of main component and kind of adjuvant, if used. Therefore, there is the case that it is rather convenient to apply the main component per se or a mixture of the main component with adjuvant or excipient.

On the other hand, the same amount as that for curative purpose or less amount will accomplish the preventive purpose.

As to an administration method, most preferably, the present compositions may be taken into animals together with feedstuffs, or may be taken before feeding or pasturage.

The results of several experiments on preventive effect of bloat in sheep, using a polymer of polypropylene glycol with polyethylene glycol [a polmer comprising 10% of ethylene oxide in the product in the case of use of polypropylene glycol of average molecular weight 2000, and its toxicity is showed by $LD_{50}$=1800 mg./kg. (by oral administration of mouth] as main active ingredient, are as in the following:

EXPERIMENT 1

Preventive effect test for bloat with the above-mentioned polymer of polypropylene glycol with polyethylene glycol (represented by "A" hereinafter), silicone and soybean oil.

*Test animal.*—A hundred sheep of 2–10 years old are involuntarily divided into four groups; control group (25 heads), "A" administration group (25 heads), silicone administration group (25 heads) and soybean administration group (25 heads).

*Method.*—A pasture which abounds in Ladino clover was used as the test area.

The test was practised under the condition in which the cattle are open to bloat, such as putting the cattle to grass in hunger condition.

After 3 grams of "A" to one group, 3 grams of silicone to another group and 15 milliliters of soybean oil to remaining group were administered, per sheep in the morning the sheep were set free to gross 2–3 hours in the morning and in the afternoon, and the number of bloat occurrence was observed.

*Administration doses and method.*—

Control group—no remedy was administered.

An administration group—3 grams of "A" per sheep a day were administered as a solution diluted with water.

Silicone administration group—3 grams of silicone per sheep a day were administered as a solution diluted with water.

Soybean oil administration group—15 milliliters of soybean oil per sheep a day were administered.

*Table 1*

THE NUMBER AND FREQUENCY OF BLOAT OCCURRENCE

|  | Control group | "A" group | Silicone group | Soybean oil group |
|---|---|---|---|---|
| 1st day p.m. | 9 | 4 | 2 | 5 |
| 2nd day a.m. | 1 | 0 | 1 | 3 |
| p.m. | 6 | 1 | 4 | 4 |
| 3rd day a.m. | 2 | 1 | 1 | 1 |
| p.m. | 0 | 0 | 0 | 0 |
| 4th day a.m. | 3 | 0 | 2 | 2 |
| p.m. | 5 | 1 | 1 | 2 |
| 5th day a.m. | 2 | 0 | 1 | 3 |
| p.m. | 2 | 2 | 1 | 3 |
| 6th day: a.m. | 0 | 0 | 0 | 0 |
| p.m. | 2 | 1 | 0 | 0 |
| 7th day: a.m. | 9 | 5 | 4 | 1 |
| p.m. | 5 | 1 | 4 | 5 |
| 8th day: a.m. | 6 | 1 | 3 | 0 |
| p.m. | 2 | 0 | 5 | 2 |
| 9th day: a.m. | 3 | 1 | 3 | 0 |
| p.m. | 1 | 0 | 0 | 1 |
| 10th day: a.m. | 0 | 0 | 0 | 0 |
| p.m. | 0 | 0 | 0 | 0 |
| 11th day: a.m. | 4 | 0 | 1 | 1 |
| p.m. | 3 | 0 | 0 | 3 |
| 12th day: a.m. | 1 | 0 | 2 | 1 |
| p.m. | 2 | 0 | 2 | 2 |
| 13th day: p.m. | 0 | 0 | 0 | 0 |
| Total | 68 | 18 | 37 | 39 |
| Occurrence percentage (average) | 11.3 | 3.0 | 6.0 | 6.5 |

As shown in Table 1, average occurrence percentage of bloat of "A" group, silicone group and soybean oil group, is considerably low in comparison with that of control group, 11.3%, and above all, that of A group is one-fourth as low as control group, and one-half as low as silicone group and soybean oil group.

Experiment 2 was further practised in a similar manner to Experiment 1 except adding a remedy to the feedstuff before pasturage.

EXPERIMENT 2

Sorbitan trilaurate is shown as "B" in this test.

*Administered doses and administration procedure.—*
 Control group (25 heads)—no remedy was administered.
 "A" administration group (25 heads)—3 grams of "A" per sheep a day were administered by admixing with 150 grams of dent corn meal.
 "B" administration group (25 heads)—3 grams of "B" per sheep a day were administered by admixing with 150 grams of dent corn meal.
 Soybean oil administration group (25 heads)—15 milliliters of soybean oil per sheep a day were administered by admixing with 150 grams of dent corn meal.

*Table 2*

THE NUMBER AND FREQUENCY OF BLOAT OCCURRENCE

|  | Control group | "A" group | "B" group | Soybean oil group |
|---|---|---|---|---|
| 1st day: | | | | |
| a.m | 0 | 1 | 0 | 0 |
| p.m | 4 | 0 | 2 | 4 |
| 2nd day: | | | | |
| a.m | 0 | 0 | 0 | 0 |
| p.m | 2 | 0 | 0 | 1 |
| 3rd day: | | | | |
| a.m | 3 | 0 | 3 | 1 |
| p.m | 10 | 4 | 4 | 6 |
| 4th day: | | | | |
| a.m | 8 | 0 | 5 | 3 |
| p.m | 7 | 3 | 5 | 6 |
| 5th day: | | | | |
| a.m | 0 | 0 | 0 | 0 |
| p.m | 1 | 1 | 0 | 5 |
| 6th day: | | | | |
| a.m | 0 | 0 | 0 | 0 |
| p.m | 1 | 0 | 0 | 0 |

*Table 2—Continued*

|  | Control group | "A" group | "B" group | Soybean oil group |
|---|---|---|---|---|
| 7th day: | | | | |
| a.m | 0 | 0 | 0 | 0 |
| p.m | 0 | 0 | 0 | 0 |
| 8th day: | | | | |
| a.m | 0 | 0 | 0 | 0 |
| p.m | 0 | 2 | 0 | 0 |
| 9th day: p.m | 0 | 0 | 0 | 0 |
| 10th day: | | | | |
| a.m | 0 | 0 | 0 | 0 |
| p.m | 4 | 1 | 1 | 3 |
| 11th day: | | | | |
| a.m | 0 | 0 | 0 | 0 |
| p.m | 8 | 1 | 6 | 7 |
| 12th day: | | | | |
| a.m | 0 | 0 | 0 | 0 |
| p.m | 0 | 0 | 0 | 0 |
| 13th day: | | | | |
| a.m | 0 | 0 | 0 | 0 |
| p.m | 4 | 1 | 1 | 2 |
| Total | 52 | 14 | 27 | 38 |
| Occurrence percentage (average) | 8.3 | 2.2 | 4.3 | 6.1 |

EXPERIMENT 3

Frothing grade and surface tension of rumen liquids of the pastured sheep administered with a surface-active agent were examined.

*Procedure.—*Test animals were set free to grasses after administration of "A", silicone and soybean oil as test 1. 8 hours after administration and after pasturage during 5 hours about 50 milliliters of rumen liquid were taken out by a catheter from each test animal.

*Frothing grade test.—*Rumen liquid (10 millimeter altitude) in a corked test tube bottomed with glass filter is bubbled by suction at negative pressure of 40 mm. Hg, then the altitude of froth formed above the liquid levels were observed after 0.5, 1, 1.5, 2, 2.5, and 3 minutes.

*Table 3*

| Group | Condition | Number of samples | Surface tension, dyn./cm. | Altitude of froth during bubbling after— | | | | | |
|---|---|---|---|---|---|---|---|---|---|
|  |  |  |  | 0.5 min. (mm.) | 1 min. (mm.) | 1.5 min. (mm.) | 2 min. (mm.) | 2.5 min. (mm.) | 3 min. (mm.) |
| Control | 8 hr. after administration | 1 | 60.5 | 17 | 25 | 29 | 32 | 33 | 33 |
|  |  | 2 | 56.5 |  |  |  |  |  |  |
|  |  | 3 | 55.7 |  |  |  |  |  |  |
|  |  | 4 | 65.0 | 15 | 19 | 23 | 25 | 26 | 27 |
| Aver |  |  | 59.1 | 16 | 22 | 26 | 29 | 30 | 30 |
| "A" | do | 1 | 49.3 | 19 | 25 | 28 | 14 | 14 | 14 |
|  |  | 2 | 50.5 | 26 | 17 | 18 | 18 | 11 | 11 |
|  |  | 3 | 51.0 | 17 | 22 | 22 | 25 | 26 | 25 | 20 |
|  |  | 4 | 50.6 |  |  |  |  |  |  |
| Aver |  |  | 50.4 | 19 | 22 | 25 | 22 | 19 | 18 |
| Soybean oil | do | 1 | 57.9 | 17 | 19 | 22 | 23 | 24 | 24 |
|  |  | 2 | 56.3 | 19 | 24 | 30 | 33 | 33 | 30 |
|  |  | 3 | 62.2 | 15 | 19 | 22 | 23 | 24 | 24 |
|  |  | 4 | 54.5 | 15 | 19 | 20 | 21 | 20 | 20 |
| Aver |  |  | 57.7 | 17 | 20 | 24 | 25 | 25 | 25 |
| Silicone | do | 1 | 55.7 | 17 | 22 | 24 | 25 | 24 | 24 |
|  |  | 2 |  | 17 | 23 | 26 | 28 | 28 | 27 |
|  |  | 3 | 52.7 | 15 | 18 | 20 | 21 | 23 | 23 |
| Aver |  |  | 54.2 | 16 | 21 | 23 | 25 | 25 | 25 |

Note.—In the above table, "mm." means millicentimeter or millicentimeters and "min." means minute or minutes.

From Table 3, lowering of surface tension and anti-foaming effect can be observed in "A" group, soybean oil group and silicone group in comparison with control group, and above all, considerable anti-foaming effect in "A" group can be observed.

EXPERIMENT 4

Frothing grade and surface tension of rumen liquids at 3 hours after administration were observed in a similar manner to the Experiment 3, except administering the remedy with corn meal. The result is as in the following:

*Table 4*

| | Number of samples | Average surface tension, dyne/cm. | Average altitude of froth during bubbling after— | | | | | |
|---|---|---|---|---|---|---|---|---|
| | | | 0.5 min. (mm.) | 1 min. (mm.) | 1.5 min. (mm.) | 2 min. (mm.) | 2.5 min. (mm.) | 3 min. (mm.) |
| Control group: | | | | | | | | |
| 1st day | 4 | 58.0 | 13 | 16 | 19 | 20 | 21 | 22 |
| 2nd day | 4 | 55.7 | 16 | 19 | 20 | 22 | 23 | 23 |
| "A" group: | | | | | | | | |
| 1st day | 5 | 46.6 | 16 | 15 | 15 | 15 | 15 | 15 |
| 2nd day | 5 | 45.8 | 19 | 18 | 17 | 17 | 16 | 14 |
| Soybean oil group: | | | | | | | | |
| 1st day | 4 | 55.9 | 12 | 14 | 16 | 17 | 18 | 18 |
| 2nd day | 4 | 54.7 | 15 | 16 | 19 | 20 | 21 | 21 |

NOTE.—In the above table, "mm." means millicentimeter or millicentimeters and "min." means minute or minutes.

As detailed above, remedies of the present invention are useful for prevention of bloat in ruminants, and are easy in administration and comes to hand inexpensively.

EXAMPLE 6

Polyoxyethylene sorbitane monooleate and soybean oil are admixed at the ratio of 1:1.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

EXAMPLES 7, 8 AND 9

| | Example 7 | Example 8 | Example 9 |
|---|---|---|---|
| Polypropylene-polyethylene polymer | 30 g. | 30 g. | 30 g. |
| Flavor | 2 mg. | 2 mg. | 2 mg. |
| Protease | | 5,000 U. | 5,000 U. |
| Cellulase | | 3,000 U. | 3,000 U. |
| Vitamin $B_1$ | | | 50 mg. |
| Excipient | Added to make the whole amount 100 g. | Added to make the whole amount 100 g. | Added to make the whole amount 100 g. |

NOTE.—In the above table, "g." means grams, "mg." milligrams, and the unit of cellulase activity (U) is calculated as follows:
"N" milligrams of the cellulase of Rhizopus microorganism is added to a 0.5% solution of carboxymethylcellulose in a 0.05 mole acetic acid buffer solution (pH 4.0), and the mixture is allowed to stand at 45°C. for one hour. The concentration of the reduced sugar formed is "A" gammas per milliliter as glucose.

For the purpose of giving those skilled in the art a better understanding of the invention, the following illustrative examples of preparations are given.

EXAMPLE 1

Polypropylene-polyethylene polymer and soybean oil are admixed at the ratio of 1:1. This preparation may be available as a solution or by adding to the various feeds.

EXAMPLE 2

One kilogram of polypropylene-polyethylene polymer is added to 50 kilograms of corn meal and admixed. This preparation may be used by adding to various feeds.

EXAMPLE 3

Sorbitan trioleate and soybean oil are admixed at the ratio of 1:1.

EXAMPLE 4

One kilogram of sorbitan monolaurate is added to 30 kilograms of corn meal and admixed. This preparation may be used by mixing with various feeds.

EXAMPLE 5

One kilogram of polyoxyethylene sorbitan monolaurate is added to 30 kilograms of corn meal and admixed. This preparation may be used as Example 4.

The unit of cellulase activity per milligram=

$$\frac{3.436 \times 10^{0.00425A}}{N}$$

The unit of the protease is defined as the enzymatic activity to hydrolyse casein in its 0.5% solution at 45° C. at pH 2.5 per minute into those substances equivalent to 1 gamma of tyrosine, which are soluble in a solution containing 0.11 mole of trichloroacetic acid, 0.22 mole of sodium acetate and 0.33 mole of acetic acid, and which are colored with Folin's reagent.

What is claimed is:
1. A composition of matter for the prevention and treatment of frothy bloat in ruminants, which consists essentially of an anti-frothy bloat effective amount of a polymer composed of polypropylene glycol of average molecular weight 1000–3000 and 5–30% of ethylene oxide and soybean oil.
2. A composition of matter for the prevention and treatment of frothy bloat in ruminants, which consists essentially of an anti-frothy bloat effective amount of a polymer composed of polypropylene glycol of average molecular weight 2000 and 10% of ethylene oxide and soybean oil.

3. A composition of matter for the prevention and treatment of frothy bloat in ruminants, which consists essentially of an anti-frothy bloat effective amount of a polymer composed of polypropylene glycol of average molecular weight 1000 and 20% of ethylene oxide and soybean oil.

4. A method for the prevention and treatment of frothy bloat in a ruminant which comprises administering to the ruminant an anti-frothy-bloat effective dose of a polymer composed of polypropylene glycol of average molecular weight 1000–3000 and 5–30% of ethylene oxide.

5. A method for the prevention and treatment of frothy bloat in a ruminant which comprises administering to the ruminant an anti-frothy-bloat effective dose of a polymer composed of polypropylene glycol of average molecular weight 2000 and 10% of ethylene oxide.

6. A method for the prevention and treatment of frothy bloat in a ruminant which comprises administering to the ruminant an anti-frothy-bloat effective dose of a polymer composed of polypropylene glycol of average molecular weight 1000 and 20% of ethylene oxide.

References Cited by the Examiner
UNITED STATES PATENTS 2,938,832    5/1960    Huggins _____ 167—56

OTHER REFERENCES

Atlas Surfactants, 1960, pages 6–10 and 16.
Ferguson, J. Agricultural Science, vol. 46, August 1955, p. 257–266 (particularly p. 257, 262, and 263).
Successful Farming, vol. 52, June, 1954, p. 36.
The Pluronics, Mar. 1, 1952, p. 1, 2, and 6.

JULIAN S. LEVITT, *Primary Examiner.*

FRANK CACCIAPAGLIA, Jr., LEWIS GOTTS,
*Examiners.*